US005756605A

United States Patent [19]

Moad et al.

[11] Patent Number: 5,756,605
[45] Date of Patent: May 26, 1998

[54] POLYMERIZATION IN AQUEOUS MEDIA

[75] Inventors: Graeme Moad; Catherine Louise Moad, both of Kallista; Julia Krstina, Chelsea; Ezio Rizzardo, Wheelers Hill; San Hoa Thang, Clayton South, all of Australia; Michael Fryd, Moorestown, N.J.

[73] Assignees: E. I. du Pont de Nemours and Company, Wilmington, Del.; Commonwealth Scientific and Industrial, Clayton, Australia

[21] Appl. No.: 836,647

[22] PCT Filed: Nov. 8, 1995

[86] PCT No.: PCT/US95/14429

§ 371 Date: May 5, 1997

§ 102(e) Date: May 5, 1997

[87] PCT Pub. No.: WO96/15158

PCT Pub. Date: May 23, 1996

[30] Foreign Application Priority Data

Nov. 9, 1994 [AU] Australia ................. PM9304

[51] Int. Cl.$^6$ ............ C08F 4/42; C08F 2/10; C08F 12/08; C07F 15/06

[52] U.S. Cl. ............ 526/93; 526/80; 526/346; 526/82; 556/140

[58] Field of Search ................. 526/93, 80, 82, 526/346

[56] References Cited

U.S. PATENT DOCUMENTS 4,680,352   7/1987   Janowicz et al. ............ 526/147

*Primary Examiner*—Joseph L. Schofer
*Assistant Examiner*—Wu C. Cheng
*Attorney, Agent, or Firm*—James A. Costello

[57] ABSTRACT

A method for the solution or amulsion polymerization of ethylenically unsaturated monomers, styrene, and other free radical polymerizatable monomers in aqueous media in which a cobalt chain transfer agent is used which has both hydrolytic stability and solubility in water and in the organic phase with preferential solubility in the organic phase.

11 Claims, No Drawings

POLYMERIZATION IN AQUEOUS MEDIA

FIELD OF INVENTION

This invention relates to free-radical polymerization in emulsion or in aqueous solution to produce polymers with defined molecular weight and end group structures and to certain cobalt complexes employed in the polymerization process.

BACKGROUND ART

U.S. Pat. No. 5,324,879 discloses the use of cobalt(III) complexes to control molecular weights in free radical polymerization. U.S. Pat. No. 4,694,054 discloses the use of certain Co(II) complexes in emulsion polymerization.

SUMMARY OF THE INVENTION

This invention concerns a method for the solution or emulsion polymerization in aqueous media of at least one monomer selected from the group
a) 1,1-disubstituted ethylenically unsaturated monomer;
b) styrene;
c) a mixture of a and b; and
d) a mixture of at least one of a and b with one or more other free radical polymerizable monomers;
said monomer or monomer mixture comprising at least 50 percent by weight of monomer selected from at least one of a and b; comprising contacting the following materials:
i) water or a single phase water-organic solvent mixture,
ii) at least one monomer selected from a to d,
iii) a cobalt chelate chain transfer agent,
iv) an optional surfactant for emulsion polymerization,
v) an optional free radical initiator soluble in the media;
wherein the cobalt chelate chain transfer agent has the following properties:
vi) hydrolytic stability, and
vii) solubility in water and in the organic phase, with preferential solubility in the organic phase.

We have discovered that certain types of cobalt complexes are most effective in controlling the molecular weights in emulsion polymerization or in aqueous solution. These complexes act as efficient catalytic chain transfer agents and produce polymers with unsaturated chain ends. Either cobalt (II) complexes or cobalt (III) complexes can be utilized in the present invention. The reaction conditions are extremely important in determining the success of the experiment and must be chosen with regard to the complex used.

This invention provides a process whereby free radical polymerization can be readily carried out in aqueous or part aqueous media to produce macromonomers. Such macromonomers are oligomeric or homo- or copolymers containing unsaturation at a terminus. The macromonomers are of low color and have a high degree of terminal unsaturation. The process of the invention utilizes free radical polymerization in the presence of a metal complex which gives catalytic chain transfer and which in addition has ligands necessary to convey the necessary hydrolytic stability and solubility parameters. Complexes suitable for emulsion polymerization have solubility in both the organic and aqueous phases and partition in favor of the organic phase. Complexes suitable for aqueous solution polymerisation are soluble in water-monomer or water-monomer-cosolvent mixtures.

A list of preferred complexes is shown below. It will be obvious to those skilled in the art that any metal complex which gives catalytic chain transfer and which in addition has ligands necessary to convey the necessary hydrolytic stability and solubility parameters may be used in the present invention. Preferred complexes are those selected from square planar cobalt(II) and cobalt(III) chelates.

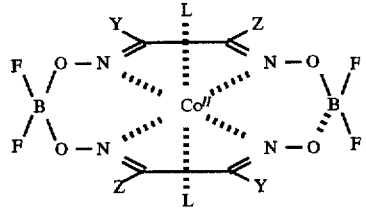

Co(II)(DPG—BF$_2$)$_2$    Y = Z = Ph, L = ligand
CO(II)(DMG—BF$_2$)$_2$    Y = Z = Me, L = ligand
CO(II)(EMG—BF$_2$)$_2$    Y = Me, Z = Et, L = ligand
CO(II)(DEG—BF$_2$)$_2$    Y = Z = Et, L = ligand
CO(II)(CHG—BF$_2$)$_2$    Y + Z = —(CH$_2$)$_4$-(cyclohexyl), L = ligand.

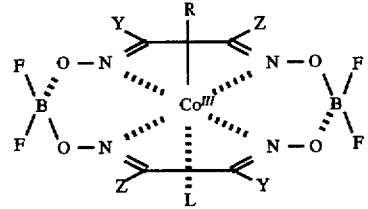

RCo(III)(DPG—BF$_2$)$_2$    Y = Z = Ph, R = alkyl, L = ligand
RCo(III)(DMG—BF$_2$)$_2$    Y = Z = Me, R = alkyl, L = ligand
RCo(III)(EMG—BF$_2$)$_2$    Y = Me, Z = Et, R = alkyl, L = ligand
RCo(III)(DEG—BF$_2$)$_2$    Y = Z = Et, R = alkyl, L = ligand
RCo(III)(CHG—BF$_2$)$_2$    Y + Z = —(CH$_2$)$_4$-(cyclohexyl), R = alkyl, L = ligand
RCo(III)(DMG—BF$_2$)$_2$    Y = Z = Me, R = halogen, L = ligand.

The cobalt (III) complexes based on BF$_2$-bridged 3,4-hexandione dioxime, 2,3-pentandione dioxime and 1,2-cyclohexanedione dioxime ligands are designed to give improved stability and/or solubility parameters.

Cobalt(II) complexes [for example, Co(II)(DMG-BF$_2$)$_2$], although effective in emulsion polymerization, have disadvantages when used directly because of their extreme sensitivity to air. It is, therefore, preferable to use cobalt(III) complexes [for example, iPrCo(III)(DMG-BF$_2$)$_2$] which generate the active cobalt(II) species in situ under the reaction conditions. In the case of most alkyl cobalt (III) complexes this involves homolytic scission of the cobalt-R bond.

Other complexes that can be used include cobalt(III) complexes which are reduced to cobalt (II) complexes in a bimolecular process involving reaction with other species in the reaction medium [for example, ClCo(III)(DMG-BF$_2$)$_2$ or MeCo(III)(DEG-BF$_2$)$_2$]. Cobalt(III) complexes which are not as readily converted to cobalt (II) complexes [for example MeCo(III)(DMG-BF$_2$)$_2$] are less effective in controlling molecular weight.

DETAILS OF THE INVENTION

To achieve best control over molecular weight, the ligands (L) are selected to suit the reaction conditions (monomers, cosolvents, surfactant, reaction temperature, etc.). L is selected from Lewis bases including tertiary amines (such as pyridine), water, ether, phosphines, and the like, as will be obvious to one skilled in the art. The use of the cobalt (II) complexes [for example Co(II)(DMG-BF$_2$)$_2$] gives poor results with hydroxy and acid monomers [for example HEMA or MAA]. The use of the corresponding cobalt(III)

complexes, iPrCo(III)DMG-BF$_2$)$_2$ or MeCo(III)(DEG-BF$_2$)$_2$], which are compatible with hydroxy and acid monomers, gives good results.

The activity of the cobalt(III) complexes shows less dependence on surfactant type than is seen with cobalt(II) complexes. Depending on the reaction conditions cobalt(III) complexes are up to 3–20 fold more active than the corresponding cobalt(II) complexes in reducing molecular weight in emulsion polymerization. Although use of a surfactant (iv) may be desirable, such use is not necessary for self-stabilizing systems or systems otherwise stable such as by employment of block or graft copolymer stabilizers.

An important factor in controlling activity in emulsion polymerization is the solubility of the complex in aqueous and organic media. The complex should be soluble in both the organic and aqueous phases and the partition coefficient between the aqueous and organic phases should be in favor of the organic phase. Complexes based on diethyl glyoxime [for example, iPrCo(III)(DEG-BF$_2$)$_2$] are more active than those based on dimethyl glyoxime [for example, iPrCo(III) (DMG-BF$_2$)$_2$].

However, some water solubility is required for the complex to distribute through the reaction mixture. The diphenyl glyoxime complexes [for example, Co(II)(DPG-BF$_2$)$_2$ and MeCo(III)(DPG-BF$_2$)$_2$] show much reduced activity with respect to corresponding dimethyl glyoxime complexes [for example Co(II)(DMG-BF$_2$)$_2$ and iPrCo(III)(DMG-BF$_2$)$_2$].

Higher complex concentrations are required for molecular weight control with very hydrophobic monomers, for example BMA or styrene. This result is most likely due to the lower solubility of the complex in the organic phase. Use of the term "styrene" herein is intended to include substituted styrenes as well.

Another important factor is the stability of the complex to hydrolysis. Incremental addition of the complex during the reaction improves molecular weight control especially in polymerizations of acid monomers (e.g. MAA) or with acidic reaction conditions. For both cobalt(II) and cobalt(III) glyoxime complexes, BF$_2$-bridging improves the hydrolytic stability of the complexes. The use of lower reaction temperatures is also advantageous.

Water soluble azo-compounds, for example 4,4'-azobis (cyanovaleric acid), are the preferred initiators for emulsion polymerization and for aqueous solution polymerization. Faster decomposing azo compounds, for example, WAKO V-44 [2,2'-azobis(N,N'-dimethyleneisobutyramidine) dihydrochloride], allow use of lower reaction temperatures (50°–60° C.) and are preferred for polymerizations involving methacrylic acid. Organic soluble azo-compounds can also be used for emulsion polymerization in some cases.

The preferred monomers for use with this invention are a-methylvinyl and styrenic monomers, mixtures of these monomers and mixtures of these monomers with other unsaturated monomers including acrylic monomers. The preferred a-methylvinyl monomers include: alkyl methacrylates (e.g. MMA, EMA, n-BMA, t-BMA, 2-EA, PHMA, etc.) substituted alkyl methacrylates (e.g. HEMA, GMA, etc.), methacrylic acid (e.g. MAA), etc.

In emulsion polymerization, a wide range of surfactants and surfactant concentrations have been used in conjunction with cobalt(III) complexes. Both ionic and non-ionic surfactants may be employed. These surfactants include SDS, ADS, AerosolMA, Teric N40, Teric NX40L, alkanate, AerosolOT/Teric N40 and similar surfactants. These surfactants may be used alone or in combination.

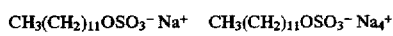

SDS     ADS

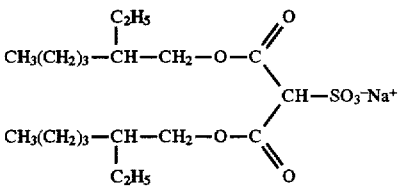

Aerosol OT

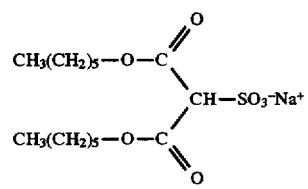

Aerosol MA80

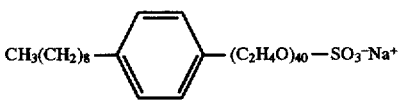

Teric 35N5 (Alkarate)

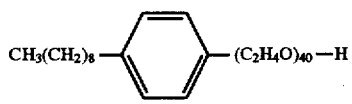

Teric N40

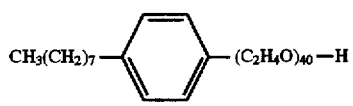

Teric NX40L

This invention will lead to polymers with a high degree of terminal unsaturation (typically in excess of 90%). Polymers formed with a-methyl vinyl monomers ($CH_2$=C($CH_3$)X) will have the following end-group structure.

The products can thus be used as macromonomers in a wide variety of applications. The end group functionality of the low molecular weight methacrylate ester polymers formed by the processes described can be established quantitatively by NMR spectroscopy or by thermogravimetric analysis. Some typical results are as follows. Within experimental error, there is one unsaturated end group per molecule.

TABLE 1

End Group Functionality in Macromonomers

| Macromonomer | complex[a] | $M_n$[b] | end groups/molecule[c] |
|---|---|---|---|
| MMA | iPrCo(III)(DMG-BF$_2$)$_2$ | 1400 | 1.04 |
| MMA | MeCo(III)(EMG-BF$_2$)$_2$ | 2100 | 0.98 |

TABLE 1-continued

End Group Functionality in Macromonomers

| Macromonomer | complex[a] | $\bar{M}_n$[b] | end groups/molecule[c] |
|---|---|---|---|
| MMA | MeCo(III)(DEG-BF$_2$)$_2$ | 2400 | 0.98 |
| HEMA | iPrCo(III)(DMG-BF$_2$)$_2$ | 810 | 0.97 |

[a]cobalt complex used in macromonomer synthesis.
[b]GPC number average molecular weight.
[c]unsaturated chain end as estimated by NMR.

Some of general advantages of polymerisation in emulsion and aqueous solution polymerisation is organic solutions have been delineated above. A further unexpected and important advantage of forming macromonomers in aqueous or part-aqueous media is that the products have substantially less color than those formed in organic media. Color is extremely important in many applications, for example, clear and light colored coatings and other materials.

Illustrative of the invention are the following examples showing the dependence of molecular weight on the type of complex, surfactant and comonomers employed; application to copolymer synthesis; and aqueous solution polymerisation of methacrylic acid and 2-hydroxyethyl methacrylate.

Key

| | |
|---|---|
| MMA | methyl methacrylate |
| HEMA | hydroxyethyl methacrylate |
| nBMA | n-butyl methacrylate |
| tBMA | t-butyl methacrylate |
| PhMA | phenyl methacrylate |
| 2-EHMA | 2-ethylhexyl methacrylate |
| MAA | methacrylic acid |
| MAm | methacrylamide |
| GMA | glycidyl methacrylate |

EXAMPLES 1-10

Emulsion polymerization with cobalt (II) complexes

Initial Charge:

| Solution 1: | Water | 733 g |
|---|---|---|
| | Surfactant solution (30% w/v) | 10.14 g |
| Solution 2: | 4,4'-azobis(cyanovaleric acid) | 1.32 g |
| | cobalt(II) complex | x ppm |
| | MMA | 35.2 g |
| Solution 3: | MMA | 317 g |
| Solution 4: | Water | 90 g |
| | Surfactant solution (30% w/v) | 10.98 g |

Solution 1 was degassed over 30 minutes and heated to 80° C. when solution 2 and 10% of solution 4 was added in one shot. Solution 3 and the remaining solution 4 were then added over 90 min. The reaction temperature was then held for a further 90 min. The results of this and similar experiments are summarized in Table 2.

TABLE 2

Effect of Complex, Surfactant and Initiator, Cobalt (II) Complexes

| Example | Complex | Conc (ppm) | Initiator | $\bar{M}_n$ | $\bar{M}_w/\bar{M}_n$ | Surfactant | Particle size |
|---|---|---|---|---|---|---|---|
| | none | 0 | 0.27% V5010 | 177100 | 2.1 | 1.4% ADS | 99 |
| 1 | Co(II)DPG | 50 | 0.27% V5010 | 151000 | 2.2 | 1.4% ADS | 87 |
| 2 | Co(II)DMG | 5 | 0.27% V5010 | 192600 | 2.1 | 1.4% ADS | 93 |
| 3 | | 50 | 0.27% V5010 | 171400 | 1.8 | 1.4% ADS | 95 |
| 4 | Co(II)DPG | 50 | 0.27% V5010 | 179000 | 2.3 | 1.4% SDS | 80 |
| 5 | Co(II)DMG | 50 | 0.27% 5010 | 20000 | :1.8 | 1.4% SDS | 281 |
| 6 | | 100 | 0.27% V5010 | 16100 | 2.5 | 1.4% SDS | 407 |
| | none | 0 | 0.1% V5010 | 585600 | 2.3 | 1.4% SDS | 115 |
| 7 | Co(II)DMG | 50 | 0.1% V5010 | 70600 | 2.4 | 1.4% SDS | 322 |
| | none | 0 | 0.1% V5010 | 452500 | 2.1 | 6% SDS | 68 |
| 8 | Co(II)DMG | 50 | 0.1% V5010 | 48200 | 2.1 | 6% SDS | 206 |
| 9 | Co(II)DMG | 100 | 0.1% V5010 | 38400 | 2.6 | 6% SDS | 276 |
| | none | 0 | 0.1% APS | 132152 | 3.3 | 1.4% SDS | 148 |
| 10 | Co(II)DMG | 50 | 0.1% APS | 64768 | 1.7 | 1.4% SDS | 118 |

[a]initiators: APS ammonium persulphate; V5010 4,4'-azobis(cyanovaleric acid)

EXAMPLES 11-33

Emulsion polymerization with cobalt (IU) complexes (with surfactant feed)

| Solution 1: | Water | 75 g |
|---|---|---|
| | Surfactant solution (10% w/v) | 3 g |
| | 4,4'-azobis(cyanovaleric acid) | 140 mg |
| Solution 2: | Surfactant solution (10% w/v) | 1 g |
| | iPrCo(III)(DMG-BF$_2$)$_2$ | 1.96 mg |
| | MMA | 3.5 g |
| Solution 3: | MMA | 31.2 g |
| Solution 4: | Surfactant solution (10% w/v) | 8 g |

Solution 1 was degassed over 20 minutes and heated to 80° C. when solution 2 was added in one shot. The feeds (solution 3 and 4) were commenced and added over 90 min. The reaction temperature was then increased to 85° C. and heating and stirring continued for a further 90 min. Results of this and similar experiments are summarized in Tables 3-5.

TABLE 3

Effect of Complex on Emulsion Polymerisation of MMA[a]

| Example | Complex | conc ppm | $\bar{M}_n$ | $\bar{M}_w/\bar{M}_n$ | % Conv | % coagulum |
|---|---|---|---|---|---|---|
| | none | 0 | 181000 | 2.5 | 100 | — |
| 11 | Co(II)(DMG-BF$_2$)$_2$ | 14 | 29900 | 2.4 | 95 | 5 |
| 12 | iPrCo(III)(DMG-BF$_2$)$_2$ | 17 | 10000 | 2.2 | 100 | 4 |
| 13 | 2-octyl Co(III)(DMG-BF$_2$)$_2$ | 18 | 6200 | 17 | 34 | 4 |
| 14 | iPrCo(II)(CHG-BF$_2$)$_2$ | 16 | 18600 | 2.1 | 100 | 3 |
| 15 | MeCo(III)(EMG-BF$_2$)$_2$ | 16 | 6200 | 1.9 | 91 | 4 |
| 16 | MeCo(III)(DEG-BF$_2$)$_2$ | 16 | 3200 | 1.6 | 93 | 6 |
| 17 | Co(II)(DPG-BF$_2$)$_2$ | 22 | 119200 | 2.5 | 72 | 1 |
| 18 | EtCo(III)(DPG-BF$_2$)$_2$ | 24 | 30600 | 1.9 | 92 | 5 |

[a]1% (w/v) SDS surfactant

TABLE 4

Effect of Surfactant on Emulsion Polymerization of MMA[a]

| Example | Surfactant | wt %[b] | $\bar{M}_n$ | $\bar{M}_w/\bar{M}_n$ | % Conv'd | % coagulum |
|---|---|---|---|---|---|---|
| 19 | SDS | 0.1 | 14200 | 2.5 | 100 | 11 |
| 20 | SDS | 0.5 | 10600 | 3.2 | 92 | 4 |
| 21 | SDS | 1.0 | 10000 | 2.1 | 100 | 4 |
| 22 | SDS | 3.0 | 8100 | 1.0 | 100 | 14 |
| 23 | SDS | 1.0 | 16000 | 2.2 | 62 | 2 |
| 24 | Aerosol MA80 | 1.0 | 13100 | 2.0 | 80 | 13 |
| 25 | SDS/Teric N40 | 0.1 | 11200 | 2.9 | 100 | 6 |
| 26 | SDS/Teric NX40L | 0.1 | 12300 | 2.5 | 100 | 17 |
| 27 | alkanate | 0.1 | 21000 | 2.0 | 88 | 13 |
| 28 | AerosolOT/Teric N40 | 0.1 | 12700 | 2.0 | 92 | 16 |
| 29 | AerosolOT/Teric NX40L | 0.1 | 29800 | 2.2 | 91 | 12 |

[a]iPrCo(III)(DMG-BF$_2$)$_2$ concentration 19 ppm.
[b]Surfactant level

TABLE 5

Effect of Comonomers on Emulsion Polymerization of MMA

| Example | Comonomers | ratio | $\bar{M}_n$ | $\bar{M}_w/\bar{M}_n$ | % Conv |
|---|---|---|---|---|---|
| | none[a] | — | 10000 | — | 100 |
| 30 | HEMA[a,c] | 8:1 | 10600 | 2.0 | 75 |
| 31 | HEMA[b,c] | 8:1 | 19000 | 3.0 | |
| 32 | MAA[b] | 8:1 | 17600 | 2.6 | 90 |
| 33 | n-BMA:2-EHMA:MAA:HEMA:MAm[a] | [d] | 8500 | 2.2 | 90 |

[a]1% (w/v) SDS surfactant, iPrCo(III)(DMG-BF$_2$)$_2$ concentration 17 ppm.
[b]1% (w/v) SDS surfactant, iPrCo(III)(CHG-BF$_2$)$_2$ concentration 17 ppm.
[c]control (no complex) gave $\bar{M}_n$ 119500, $\bar{M}_w/\bar{M}_n$ 6.9.
[d]ratio of monomers was 10:1:1:20:1

EXAMPLES 34–49

Emulsion polymerisation recipe (no surfactant feed)

| Initial Charge: | | |
|---|---|---|
| Solution 1: | Water | 75 g |
| | SDS solution (10% w/v) | 3 g |
| | 4,4'-azobis(cyanovaleric acid) | 140 mg |
| Solution 2: | iPrCo(III)(DMG-BF$_2$)$_2$ | 2 mg |
| | MMA | 3.5 g |
| Feed: | MMA | 31.7 g |

Water was degassed over 20 minutes and heated to 80° C. when solution 2 was added in one shot. The MMA feed was then added over 90 min. The reaction temperature was then increased to 85° C. and heating and stirring continued for a further 90 min. Results are summarized in Tables 6 and 7.

TABLE 6

Emulsion Polymerisations of MMA - dialkylglyoxime based complexes[a]

| Example | Complex | conc. ppm | $\bar{M}_n$ | $\bar{M}_w/\bar{M}_n$ | % Conv. |
|---|---|---|---|---|---|
| 34 | iPrCo(III)(DMG-BF$_2$)$_2$ | 19 | 13400 | 3.68 | 100 |
| 35 | | 190 | 1400 | 3.03 | 83 |
| 36 | MeCo(III)(EMG-BF$_2$)$_2$ | 19 | 4300 | 1.87 | 100 |
| 37 | | 45[b] | 2100 | 1.69 | 94 |
| 38 | MeCo(III)(DEG-BF$_2$)$_2$ | 19 | 2900 | 1.58 | 69 |
| 39 | | 57 | 920 | 1.65 | 51 |
| 40 | | 49[b] | 730 | 1.70 | 82 |
| 41 | | 48[b] | 900 | 1.78 | 90 |
| 42 | MeCo(III)(DMG-BF$_2$)$_2$ | 46[b] | 13700 | 2.65 | 100 |
| 43 | | | 14700 | 2.55 | 100 |

[a]1% (w/v) SDS surfactant.
[b]30% of total complex added in MMA feed.

TABLE 7

Emulsion Polymerisation of Other Monomers[a]

| Example | Monomer | Complex | conc. ppm | $\bar{M}_n$ | $\bar{M}_w/\bar{M}_n$ | % Conv |
|---|---|---|---|---|---|---|
| 44 | n-BMA | iPrCo(III)(DMG-BF$_2$)$_2$ | 48 | 9800 | 1.8 | 98 |
| 45 | n-BMA | MeCo(III)(DEG-BF$_2$)$_2$ | 48 | 5200 | 2.5 | 97 |
| 46 | n-BMA | MeCo(III)(EMG-BF$_2$)$_2$ | 48 | 9400 | 2.5 | 100 |
| 47 | t-BMA | MeCo(III)(DEG-BF$_2$)$_2$ | 43 | 3700 | 2.0 | 100 |
| 48 | PhMA | MeCo(III)(DEG-BF$_2$)$_2$ | 43 | 18000 | 2.3 | 100 |
| 49 | GMA | iPrCo(III)(DMG-BF$_2$)$_2$ | 109 | 3500 | 1.8 | 90 |

[a] 30% of complex added with monomer feed, 1% (w/v) SDS surfactant.

EXAMPLES 50–51

Preparation of Styrene

| Initial Charge: | |
|---|---|
| distilled water | 75.03 g |
| Initiator (azobiscyanopentanoic acid) | 0.1440 g |
| Surfactant (10% aq. soln of sodium dodecyl sulfate) | 3.14 g |
| Styrene | 3.59 g |
| MeCo(III)(DEG-BF$_2$)$_2$ | 0.0031 g |
| Acetone | 0.5 mL |
| (Complex was dissolved in acetone) | |
| Feed 1 (180 min @ 0.200 mL/min) | |
| Styrene | 33.01 g |
| MeCo(III)(DEG-BF$_2$)$_2$ | 0.0121 g |
| Acetone | 1.0 mL |
| (Complex was dissolved in acetone) | |
| Feed 2 (90 min @ 0.089 mL/min) | |
| Initiator (azobiscyanopentanoic acid) | 0.0690 g |
| Surfactant (10% aq. soln of SDS) | 8.12 g |
| (This solution was prepared by gently warming to 60° C.) | |

Water was charged to a 5 neck, 250 mL reactor fitted with stirrer (400 rpm), condenser and thermocouple under a blanket of nitrogen. Initiator and surfactant were added to the reactor as single shots and heated to 80° C. When the reactor reached 80° C., the cobalt and styrene were added as single shots and Feed 1 commenced over 180 min. Some of the cobalt precipitated out of the monomer feed. Feed 2 (containing initiator/surfactant) was started 30 min after the start of polymerisation. The reactor was maintained at 80° C. for 90 min after the completion of the monomer feed, then cooled. The reactor was sampled at 30 min intervals to monitor molecular weight and conversion. Yield: 105.3 g stable white latex+small amount (<0.2 g) yellow coagulum

TABLE 8

Emulsion Polymerization of Styrene

| Example | Monomer | Complex | conc. ppm | $\bar{M}_n$ | $\bar{M}_w/\bar{M}_n$ | % Conv |
|---|---|---|---|---|---|---|
|  | Styrene | none (control) | — | 130500 | 2.7 | 93 |
| 50 | Styrene | MeCo(III)(DEG-BF$_2$)$_2$ | 127 | 44000 | 3.2 | 94 |
| 51 | Styrene | MeCo(III)(DMG-BF$_2$)$_2$ | 127 | 48000 | 4.8 | 97 |

EXAMPLE 52

Preparation of 60:40 MAA/MMA Macromonomer

| Initial Charge: | Deionised Water | 150 g |
|---|---|---|
| Solution 1: | Antrox CA897 | 0.6 g |
|  | Antrox CO436 | 0.3 g |
|  | Initiator WAKO V-44 | 0.4 g |
|  | iPrCo(III)(DMG-BF$_2$)$_2$ | 8 mg |
|  | MMA | 4 g |
| Solution 2: | iPrCo(III)(DMG-BF$_2$)$_2$ | 16 mg |
|  | MMA | 44.8 g |
| Solution 3: | MAA | 28.0 g |

Water (150 mL) was degassed for 20 minutes with a nitrogen purge and heated to 58° C. Solution 1 was added in one shot. The feeds (solutions 2 and 3) were then added over 60 minutes. That rate of feed two was such that 5 g was added over the first 20 min, 10 g over the second 20 min, and the remainder over the third 20 min. The reaction was held at 58° C. for 30 minutes then heated to 65° C. for 1 hour and cooled. Conversion>95%, GPC molecular weight $\bar{M}_n$ 920, $\bar{M}_w/\bar{M}_n$ 1.6.

EXAMPLES 53–58

Preparation of BMA/HEMA/MA copolymer

| Initial Charge | Water | 75 g |
|---|---|---|
|  | SDS (10% solution) | 3 g |
|  | 4,4'-azobis(cyanovaleric acid) | 141 mg |
| Solution 1: | MeCo(III)(EMG-BF$_2$)$_2$ | 3.00 mg |
|  | MMA | 0.098 g |
|  | MAA | 0.62 g |
|  | BMA | 2.13 g |
|  | HEMA | 1.48 g |
| Solution 2: | MMA | 0.562 g |
|  | BMA | 12.02 g |
|  | MeCo(III)(EMG-BF$_2$)$_2$ | 2.00 mg |
| Solution 3: | MAA | 7.76 g |
|  | HEMA | 8.45 g |

The initial charge was degassed for 30 minutes with a nitrogen purge and heated to 80° C. with a preheated water bath. Solution I was added in one shot. Solutions 2 and 3 were then added simultaneously over 90 min. On completion of the feeds, the temperature was increased to 85° C. and held for 90 min. The results of this and similar experiments are summarized in Table 9.

TABLE 9

Emulsion Copolymerization of MMA/MAA/BMA/HEMA

| Example | Complex | ppm | $\bar{M}_n$ | $\bar{M}_w$ | $\bar{M}_w/\bar{M}_n$ | Conv. |
|---|---|---|---|---|---|---|
| 53 | iPrCo(III)(DMG-BF$_2$)$_2$ | 130[a] | 5900 | 17600 | 2.97 | 100% |
| 54 | iPrCo(III)(DMG-BF$_2$)$_2$ | 80[b] | 2900 | 3700 | 1.29 | 100% |
| 55 | MeCo(III)(EMG-BF$_2$)$_2$ | 110[b] | 4000 | 11400 | 2.85 | 96% |
| 56 | MeCo(III)(EMG-BF$_2$)$_2$ | 50[a] | 4900 | 12600 | 2.53 | 100% |
| 57 | MeCo(III)(DEG-BF$_2$)$_2$ | 111[b] | 830 | 1500 | 1.74 | 96% |
| 58 | MeCo(III)(DEG-BF$_2$)$_2$ | 80[a] | 2300 | 3200 | 1.44 | 100% |

[a]All complex in solution 1.
[b]40% of total complex added with Feed 1.

EXAMPLES 59–62

Preparation of GMA-MMA macromonomer

| Initial charge: | |
|---|---|
| distilled water | 75 g |
| SLS (3% solution) | 5 g |
| Solution 1: | |
| 4,4'-azobis(cyanovaleric acid) | 140 mg |
| GMA | 2.6 g |
| MMA | 1.0 g |
| MeCo(III)(DEG-BF$_2$)$_2$ | 8.9 mg |
| Feed: | |
| GMA | 18 g |
| MMA | 13.5 g |
| MeCO(III)(DEG-BF$_2$)$_2$ | 7.9 mg |

The water-SLS mixture was vacuum degassed for 30 minutes and placed 5-neck, reactor fitted with a stirrer, condenser and a thermocouple under a blanket of nitrogen and heated to 80° C. Solution 1 was then added and the Feed commenced immediately and added over 90 minutes. The reactor was maintained at 80° C. for a further 90 minutes. Conversion based on % solids was>90%.

TABLE 10

Emulsion Copolymerization of MMA and GMA

| Example | Complex | ppm | $\bar{M}_n$ | $\bar{M}_w/\bar{M}_n$ |
|---|---|---|---|---|
| 59 | iPrCo(III)(DMG-BF$_2$)$_2$[a] | 213 | 790 | 2.04 |
| 60 | IPrCo(III)(DMG-BF$_2$)$_2$[a] | 135 | 2900 | 1.51 |
| 61 | iPrCo(III)(DMG-BF$_2$)$_2$ | 100 | 3620 | 2.13 |
| 62 | MeCo(III)(DEG-BF$_2$)$_2$ | 146 | 1460 | 1.55 |

[a]Latex unstable

EXAMPLE 63
Aqueous Solution polymerization of MAA

| Initial Charge: | |
|---|---|
| distilled water | 150 g |
| Initiator (WAKO VA-044) | 0.3 g |
| water | 2 mL |
| iPrCo(III)(DMG-BF$_2$)$_2$ | 13 mg |
| acetone | 2 mL |
| Feed: | |
| methacrylic acid | 74 g |
| iPrCo(III)(DMG-BF$_2$)$_2$ | 7.5 mg |

Water (150 mL) was charged to a 5 neck, 500 mL reactor fitted with stirrer (300 rpm), condenser and thermocouple under a blanket of nitrogen and heated to 55° C. Initiator (0.3 g dissolved in 2 mL water) and iPrCo(III)(DMG-BF$_2$)$_2$ (13 mg dissolved in 2 mL acetone) were added to the reactor as single shots. The feed of MAA containing the remaining iPrCo(III)(DMG-BF$_2$)$_2$) was commenced immediately (1.23 mL/min over 60 min). The reactor was maintained at 55° C. for 30 min after the completion of the feed, then cooled. The methacrylic acid macromonomer was isolated by evaporation of the water.

Conversion: approx. 90%. NMR analysis indicates number average molecular weight of about 1000.

EXAMPLES 64–72
Aqueous Solution polymerization of HEMA

The color of the product is dramatically lighter than similar macromonomers prepared in organic solvents (e.g., isopropanol). Complex activity is also higher.

| Initial Charge: | |
|---|---|
| distilled water | 52 g |
| methanol | 23 g |
| Solution 1: | |
| 4,4'-azobis(cyanovaleric acid) | 140 g |
| iPrCo(III)(DMG-BF$_2$)$_2$ | 10 mg in 3.5 g HEMA |
| Solution 2: | |
| HEMA | 31.7 g |
| iPrCo(III)(DMG-BF$_2$)$_2$ | 7 mg |

The water-methanol mixture was charged to a 5 neck, 500 mL reactor fitted with stirrer (300 rpm), condenser and thermocouple under a blanket of nitrogen and heated to 80° C. The initiator (0.14 g dissolved in 3.5 mL HEMA) and iPrCo(III)(DMG-BF$_2$)$_2$ were added to the reactor as a single shot. The feed of HEMA containing the remaining iPrCo (III)(DMG-BF$_2$)$_2$) was commenced immediately and added over 90 min. The reactor was maintained at 80° C. for 150 min after the completion of the feed. Further aliquots of the initiator (70 mg) were added at 1 hourly intervals. The results of these experiments are sumarized in Table 11.

TABLE 11

Aqueous Solution Polymerization of HEMA

| Example | Complex | % solids | ppm | solvent | $\bar{M}_n$[a] | % Conv | Colour |
|---|---|---|---|---|---|---|---|
| 64 | MeCo(III)(DEG-BF$_2$)$_2$ | 30 | 56[a] | water | 3180 | 93 | cloudy yellow |
| 65 | iPrCo(III)(DMG-BF$_2$)$_2$ | 30 | 56[a] | water | 1470 | 87 | pale yellow |

TABLE 11-continued

Aqueous Solution Polymerization of HEMA

| Example | Complex | % solids | ppm | solvent | $\bar{M}_n{}^a$ | % Conv | Colour |
|---|---|---|---|---|---|---|---|
| 66 | iPrCo(III)(DMG-BF$_2$)$_2$ | 30 | 171* | water | 990 | 68 | pale yellow |
| 67 | iPrCo(III)(DMG-BF$_2$)$_2$ | 40 | 343 | water | 530 | 72 | pale orange |
| 68 | iPrCo(III)(DMG-BF$_2$)$_2$ | 50 | 400 | water | 490 | 72 | pale orange |
| 69 | iPrCo(III)(DMG-BF$_2$)$_2$ | 30 | 162 | isopropanol | 420 | 37 | dark brown |
| 70 | iPrCo(III)(DMG-BF$_2$)$_2$ | 30 | 160 | 70:30 water - isopropanol | 590 | 30 | brown |
| 71 | iPrCo(III)(DMG-BF$_2$)$_2$ | 30 | 105 | 70:30 water - methanol | 1610 | 98 | pale yellow |
| 72 | iPrCo(III)(DMG-BF$_2$)$_2$ | 30 | 162 | 70:30 water - methanol | 810 | 68 | pale yellow |

*number average molecular weight estimated by NMR determination of the unsaturate end groups

GENERAL PROCEDURE FOR PREPARATION OF COBALT(III) CATALYSTS

Preparation of [bis[m-[(2,3-hexanedione dioximato)(2-)-O:O']] tetrafluorodiborato (2-)-N,N',N",N'"] (methyl) (aqua) cobalt Cobalt(III) complexes of the invention and all such complexes useful in the disclosed process are made by appropriate compound substitutions in the procedure described in Paragraph A hereafter. The same is true for Cobalt(II) complexes of the invention and of utility generally in the disclosed process. One skilled in the art will have no difficulty, given the disclosure that has been provided, in making all such complexes and in pairing the appropriate Lewis base(s) and cobalt-containing moieties to obtain the claimed cobalt complexes and to obtain the fruits of the claimed process.

A. Preparation of Methyl pyridinato-Co(III)-DEG

| | | | |
|---|---|---|---|
| | Methanol | 50 | mL |
| | 3,4-hexanedione dioxime | 3.0 | g |
| | CoCl$_2$.6H$_2$O | 2.0171 | g |
| Solution 1: | Sodium hydroxide | 0.819 | g |
| | Water | 0.819 | g |
| | Pyridine | 0.670 | mL |
| Solution 2: | Sodium hydroxide | 0.532 | g |
| | Water | 0.532 | g |
| | Sodium borohydride | 0.365 | g |
| | Methyl bromide | 0.590 | mL |

The methanol was degassed under nitrogen for 20 minutes at room temperature and the CoCl$_2$.6H$_2$O and the 3,4-hexanedione dioxime were added. After ten minutes the Solution 1 was added, followed by slow addition of pyridine. The reaction mixture was cooled to −20° C. and stirring under nitrogen was continued for 20 minutes. The second sodium hydroxide solution and the sodium borohydride were added slowly. Methyl bromide was added dropwise over 20 minutes and the reaction mixture was allowed to reach room temperature. Half of the solvent was removed by evaporation and 40 mL of cold water was added. The compound was filtered and washed with a pyridine-water (5%) solution, and dried over P$_2$O$_5$.

B: Preparation of Methyl pyridinato-Co(III)-DEG BF$_2$ Bridged.

| | | |
|---|---|---|
| Methyl pyridinato-Co(III)-DEG | 3.551 | g |
| BF$_3$Et$_2$O | 9.217 | g |
| Ether | 5 | mL |

The boron triethyletherate and ether were cooled under nitrogen at −20° C. for 40 minutes. The methyl pyridinato-Co(III)-DEG was added over 20 minutes. The reaction was allowed to reach room temperature, then the compound was isolated by filtration and washed with ether.

C: Preparation of Methyl aqua-Co(III)-DEG BF$_2$ Bridged.

| | | |
|---|---|---|
| Methyl pyridinato-Co(III)-DEG BF$_2$ bridged | 3.178 | g |
| Water | 30 | mL |

The water was degassed under nitrogen at 30° C. for 10 minutes. The methyl pyridinato-Co(III)-DEG BF$_2$ Bridged complex was added and the solution held at 30° C. for 40 minutes. The solution was allowed to reach room temperature and the compound was isolated by filtration, and washed with water.

PROCEDURE FOR PREPARING COBALT(II) CATALYSTS

The Co(II) cobaloximes are prepared as are the Co(III) materials described above without the reaction of the intermediate with alkyl bromide, by reacting the appropriate dioxime with cobaltous chloride and bridging the reaction product with BF$_3$ etherate.

We claim:

1. A method for preparing macromonomers by free-radical polymerization in aqueous media of at least one monomer selected from the group
   a) 1,1-disubstituted ethylenically unsaturated monomer;
   b) styrene;
   c) a mixture of a and b; and
   d) a mixture of at least one of a and b with one or more other free radical polymerizable monomers;
   said monomer or monomer mixture comprising at least 50 percent by weight of monomer selected from at least one of a and b;
   comprising contacting the following materials:
   i) water or a single phase water-organic solvent mixture,
   ii) at least one monomer selected from a to d,
   iii) an optional surfactant for emulsion polymerization,
   iv) an optional free-radical initiator soluble in the media;
   v) a cobalt III chelate chain transfer agent having the following properties:
   vi) hydrolytic stability, and
   vii) solubility in water and in the organic phase, with preferential solubility in the organic phase.

2. A method according to claim 1 comprising emulsion polymerization employing water (i) and surfactant (iii).

3. A method according to claim 1 comprising solution polymerization employing no surfactant (iii) wherein the cobalt chelate is soluble in the water or single phase water-organic solvent.

4. A method according to claim 1 wherein the cobalt chelate chain transfer agent is selected from at least one member of the group

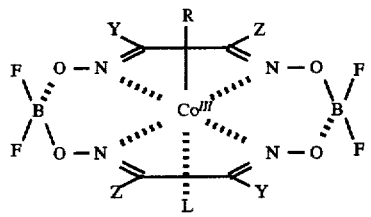

| | |
|---|---|
| RCo(III)(DPG—BF$_2$)$_2$ | Y = Z = Ph, R = alkyl, L = Lewis base |
| RCo(III)(DMG—BF$_2$)$_2$ | Y = Z = Me, R = alkyl, L = Lewis base |
| RCo(III)(EMG—BF$_2$)$_2$ | Y = Me, Z = Et, R = alkyl, L = Lewis base |
| RCo(III)(DEG—BF$_2$)$_2$ | Y = Z = Et, R = alkyl, L = Lewis base |
| RCo(III)(CHG—BF$_2$)$_2$ | Y + Z = —(CH$_2$)$_4$—, R = alkyl, L = Lewis base and |
| RCo(III)(DMG—BF$_2$)$_2$ | Y = Z = Me, R = halogen, L = Lewis base. |

5. A method according to claim 2 wherein the cobalt chelate chain transfer agent is selected from at least one member of the group

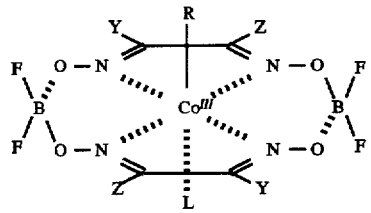

| | |
|---|---|
| RCo(III)(DPG—BF$_2$)$_2$ | Y = Z = Ph, R = alkyl, L = Lewis base |
| RCo(III)(DMG—BF$_2$)$_2$ | Y = Z = Me, R = alkyl, L = Lewis base |
| RCo(III)(EMG—BF$_2$)$_2$ | Y = Me, Z = Et, R = alkyl, L = Lewis base |
| RCo(III)(DEG—BF$_2$)$_2$ | Y = Z = Et, R = alkyl, L = Lewis base |
| RCo(III)(CHG—BF$_2$)$_2$ | Y + Z = —(CH$_2$)$_4$—, R = alkyl, L = Lewis base and |
| RCo(III)(DMG—BF$_2$)$_2$ | Y = Z = Me; R = halogen, L = Lewis base. |

6. A method according to claim 3 wherein the cobalt chelate chain transfer agent is selected from at least one member of the group

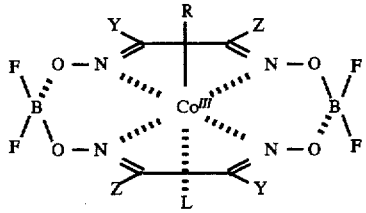

| | |
|---|---|
| RCo(III)(DPG—BF$_2$)$_2$ | Y = Z = Ph, R = alkyl, L = Lewis base |
| RCo(III)(DMG—BF$_2$)$_2$ | Y = Z = Me, R = alkyl, L = Lewis base |
| RCo(III)(EMG—BF$_2$)$_2$ | Y = Me, Z = Et, R = alkyl, L = Lewis base |
| RCo(III)(DEG—BF$_2$)$_2$ | Y = Z = Et, R = alkyl, L = Lewis base |
| RCo(III)(CHG—BF$_2$)$_2$ | Y + Z = —(CH$_2$)$_4$—, R = alkyl, L = Lewis base and |
| RCo(III)(DMG—BF$_2$)$_2$ | Y = Z = Me; R = halogen, L = Lewis base. |

7. A method according to claim 4 wherein the cobalt chelate chain transfer agent is alkylCo(III) (dimethyl glyoxime-BF$_2$)$_2$.

8. A method according to claim 4 wherein the cobalt chelate chain transfer agent is alkylCo(III) (diethyl glyoxime-BF$_2$)$_2$.

9. A method according to claim 7 wherein the alkyl is isopropyl.

10. A method according to claim 8 wherein the alkyl is isopropyl.

11. A cobalt chelate chain transfer agent selected from the group:

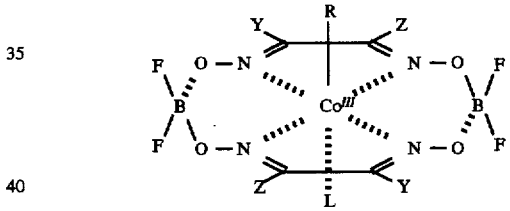

| | |
|---|---|
| RCo(III)(EMG—BF$_2$)$_2$ | Y = Me, Z = Et, R = alkyl, L = Lewis base; |
| RCo(III)(DEG—BF$_2$)$_2$ | Y = Z = Et, R = alkyl, L = Lewis base; and |
| RCo(III)(CHG—BF$_2$)$_2$ | Y + Z = —(CH$_2$)$_4$—, R = alkyl, L = Lewis base. |

* * * * *